(12) United States Patent
Trivedi

(10) Patent No.: US 6,839,196 B2
(45) Date of Patent: Jan. 4, 2005

(54) MAGNETIC TRACK FOLLOWING SERVO ALGORITHM USING SIGNAL QUALITY

(75) Inventor: Hitesh Trivedi, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 277 days.

(21) Appl. No.: 09/865,215

(22) Filed: May 24, 2001

(65) Prior Publication Data

US 2002/0176200 A1 Nov. 28, 2002

(51) Int. Cl.[7] .............................................. G11B 5/596
(52) U.S. Cl. ................................................... 360/77.06
(58) Field of Search .......................... 360/77.12, 77.01, 360/77.04, 77.06, 78.14

(56) References Cited

U.S. PATENT DOCUMENTS

| | | | |
|---|---|---|---|
| 4,349,849 A | | 9/1982 | Satoh |
| 5,309,299 A | * | 5/1994 | Crossland et al. ....... 360/77.01 |
| 5,432,652 A | * | 7/1995 | Comeaux et al. ........ 360/77.12 |
| 5,574,602 A | * | 11/1996 | Baca et al. .............. 360/77.12 |
| 5,737,342 A | | 4/1998 | Ziperovich |
| 5,872,672 A | | 2/1999 | Chliwnyj et al. |
| 5,995,315 A | * | 11/1999 | Fasen ...................... 360/77.01 |
| 6,104,766 A | | 8/2000 | Coker et al. |
| 6,108,159 A | * | 8/2000 | Nute et al. ............... 360/77.12 |
| 6,462,899 B1 | * | 10/2002 | Chliwnyi et al. ........ 360/77.12 |
| 6,594,103 B1 | * | 7/2003 | Despain et al. ......... 360/77.06 |

* cited by examiner

Primary Examiner—Sinh Tran
Assistant Examiner—Fred F. Tzeng
(74) Attorney, Agent, or Firm—Morrison & Foerster LLP

(57) ABSTRACT

A read servo mechanism that uses levels of read data signal quality to maintain track centerline is presented. In a seek operation mode, a baseline signal quality value is sampled at a current tracking position and, once the baseline signal quality value is established, the head is stepped to change its position and the signal quality value sampled after each position change to determine change in signal quality until the change in signal quality is found to be insignificant. After a predetermined interval, the signal quality value is again sampled. If the signal quality value has changed significantly or the time that has expired since the seek operation mode ended is greater than some larger interval, the seek operation is repeated in an effort to search for a new baseline level of signal quality (and, therefore, the new track center).

36 Claims, 6 Drawing Sheets

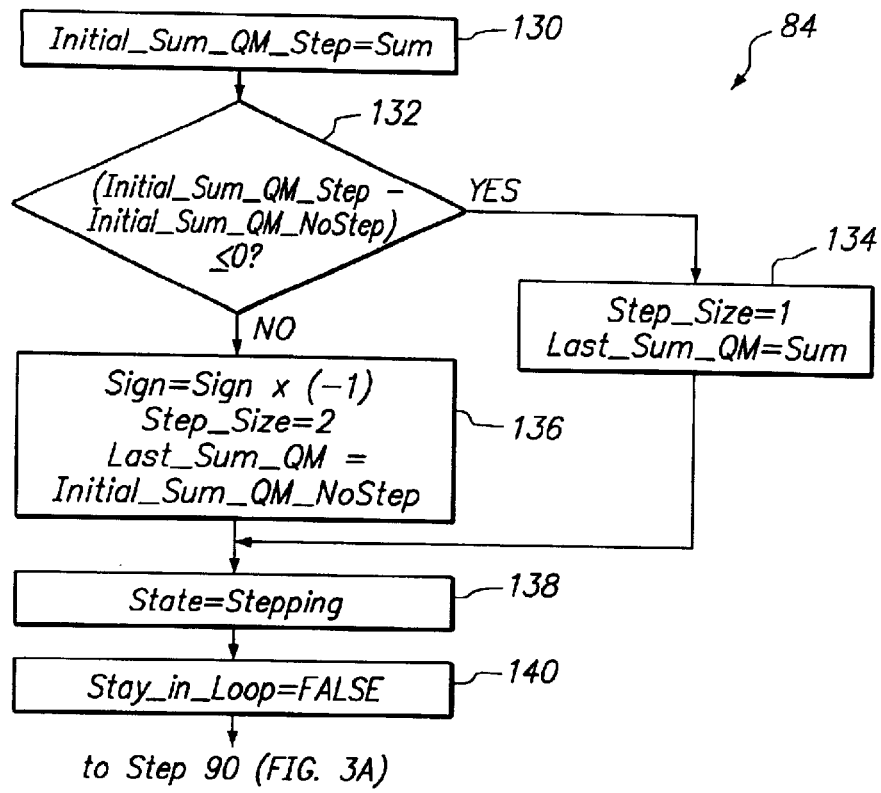
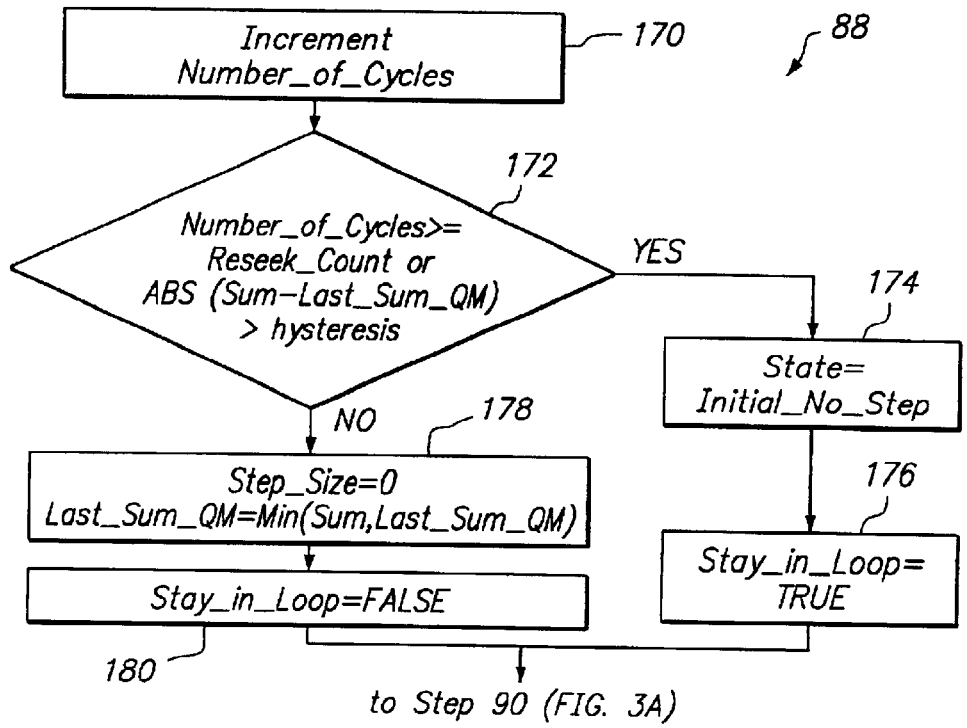

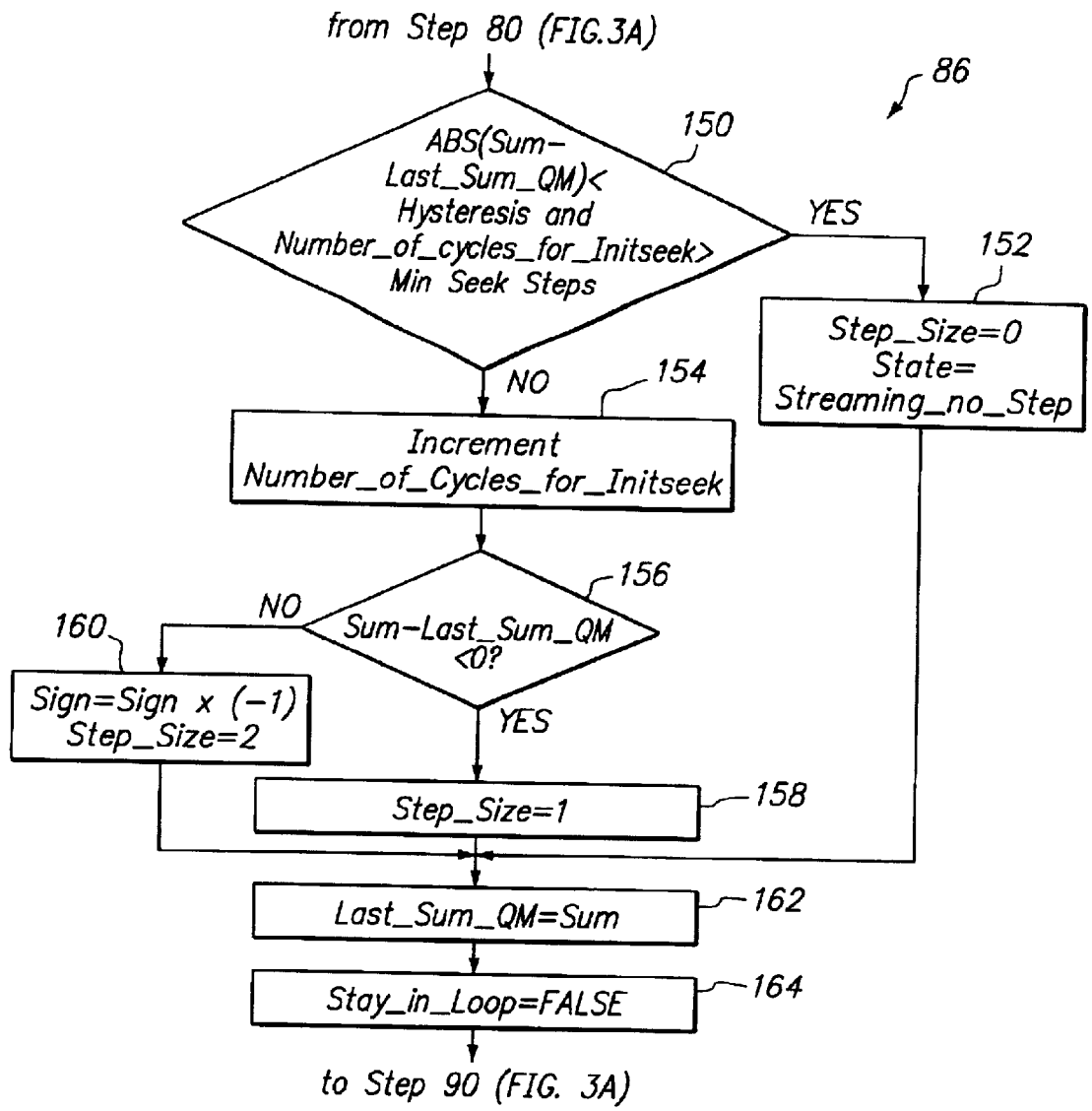

MAGNETIC TRACK FOLLOWING SERVO ALGORITHM USING SIGNAL QUALITY

BACKGROUND OF THE INVENTION

The invention relates generally to head positioning servo systems for reducing misalignment between heads and data tracks in data storage systems.

In multi-track magnetic tape storage systems, random lateral tape motion ("LTM") is a limiting factor in achieving higher track densities and higher user data capacity per tape. LTM is the random motion of a tape in a direction lateral to the direction of tape transport. LTM is impacted by variations in tension, number of tape guides used, as well as other factors. These factors affect LTM in various ways. Some may cause abrupt momentary jumps while others may cause a gradual shift over time. During a read, LTM causes mis-registration of the read head over the track being read. Such mis-registration results in read data error.

Various servo techniques or approaches have been developed to reduce the effects of tracking error caused by LTM and thus improve track density. Although known servo techniques vary somewhat, most involve mechanisms for dynamically moving the read head laterally to continually re-position it over the recorded data track. They also use servo heads to provide corrective positioning information. For example, one approach reads recorded servo information, either dedicated (that is, located on a continuous track of servo information) or embedded within the user data, to produce a position error signal for accurate head positioning. Yet another approach uses two auxiliary servo heads to follow each edge of an adjacent data track to produce a position error signal. In both of these approaches, the position error signal is based on signal amplitude.

SUMMARY OF THE INVENTION

In one aspect, the invention provides a method and apparatus for controlling a data head for reading data from a data track on a magnetic tape in a magnetic tape drive. They include determining signal quality for read data signals produced by a data head reading data from a data track and adjusting the position of the data head relative to the data track using the signal quality.

Embodiments of the invention may include one or more of the following features.

Adjusting includes performing a seek operation that includes changing the position of the data head and determining changes in the signal quality corresponding to the changes in data head position until a predetermined level of improvement in the signal quality is achieved.

Changing the position of the data head includes stepping the data head laterally across the data track. Performing the seek operation further includes using the determined changes to determine direction and size of steps of the stepping. Performing the seek operation further includes comparing each of the determined changes to a lower threshold and a current number of steps taken by seek operation to a maximum number of steps.

Adjusting further includes maintaining the data head at a current position without stepping when results of the comparison indicate that the determined change is below the lower threshold and the current number of steps taken exceeds the maximum number of steps.

Adjusting further includes monitoring the signal quality while maintaining the data head at the current position to detect any changes in the signal quality greater than the lower threshold and, if any changes greater than the lower threshold are detected, repeating the performance of the seek operation. Alternatively, adjusting can further include determining that the data head has been maintained at the current position without stepping for a period of time in excess of a predetermined maximum re-seek time threshold and repeating the performance of the seek operation.

In another aspect, the invention provides a tape drive system. The tape drive system includes a data head structure to produce read data signals from data recorded on a data track of a tape, a head stepper coupled to the data head structure and a data channel unit to produce read data signal quality values from the read data signals. The tape drive system further includes a servo controller coupled to the head stepper and the data channel unit, the servo control being configured to use the signal quality values to control adjustment of the position of the data head structure relative to the data track by the head stepper.

Particular implementations of the invention may provide one or more of the following advantages. The need for recorded servo information and/or servo heads for positioning read heads are eliminated. Also, because read data signal quality values (i.e., error signals) are a finer determiner of center of track than read data signal amplitude, bit error rates are reduced. In addition, the search for the lowest level of error (or noise) enables track following through shifts in track location in a manner that, unlike prior head positioning techniques, avoids placing a head at or near the edge of a data track where it can be knocked off of the track by even minor disturbances.

Other features and advantages of the invention will be apparent from the following detailed description and from the claims.

BRIEF DESCRIPTION OF THE DRAWINGS

FIG. 5 is a flow diagram of the initial step state.

FIG. 6 is a flow diagram of the stepping state.

FIG. 7 is a flow diagram of the streaming (no step) state.

DETAILED DESCRIPTION

Figure 1:
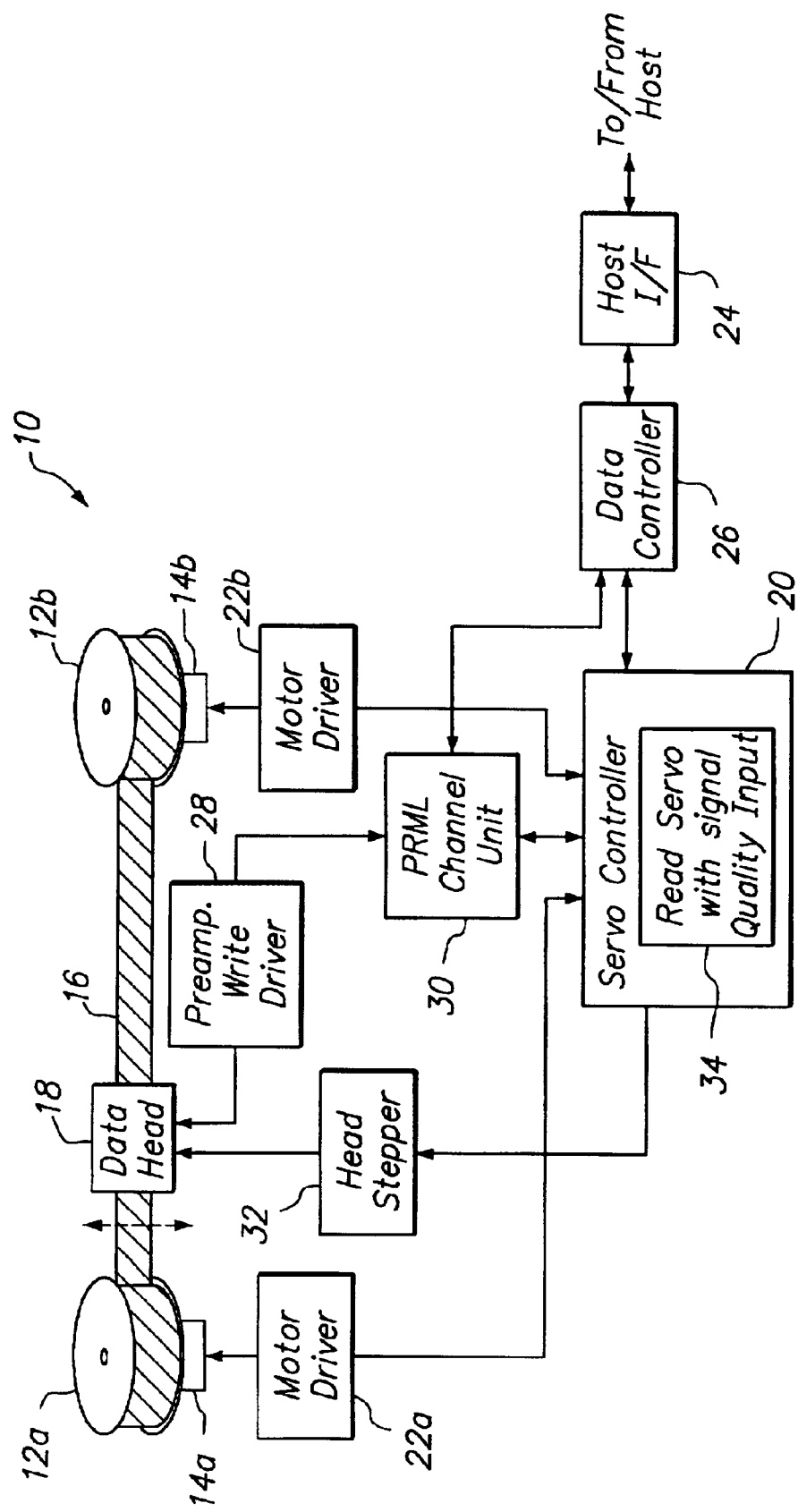
FIG. 1 is a block diagram of a tape drive system employing a read servo process that uses read data signal quality measurements to adjust alignment of a read data head with respect to a track from which data is being read.

Referring to FIG. 1, an exemplary magnetic tape drive system 10 is shown. The tape drive system 10 includes a tape transport system schematically represented by two reels 12, a supply reel 12a and a take-up reel 12b, mounted on rotatably driven tape transport motors 14a, 14b, respectively. The tape transport motors 14 rotate the reels 12 to transport a tape 16 from one reel to the other. The tape 16 has one or more longitudinal tracks of data recorded thereon. As the tape advances, it moves past a data head structure 18, which simultaneously reads from one of the data tracks on the tape 16. The data head structure 18 includes at least one read head. It can also include additional data heads for reading and/or writing data, and the other data heads may access data in the same format or in a different format. Typically, although not shown, the tape transport system 10 also includes a tachometer for sensing the tape speed and a sensor for detecting the beginning and end of tape.

As used herein, the term "longitudinal" relates to the forward or reverse direction of tape travel, whereas "lateral" refers to the direction across the tape. The lateral direction is indicated in FIG. 1 by the arrow (shown in dashed lines).

The tape drive system 10 further includes a servo controller 20, which is used to control the mechanical operation of the tape transport. In the described embodiment, the servo controller 20 is implemented with a microprocessor. The servo controller 20 could also be implemented with a microcontroller or dedicated logic circuitry. The tape transport motors 14a, 14b are controlled through motor drivers 22a, 22b, respectively. The servo controller 20 receives tape speed information from a tachometer and controls the transport motors 14a, 14b and respective drivers 22a, 22b to establish and maintain the proper tape tension and velocity, including ramping the tape speed up and down.

Communication with a host via a host interface 24 is handled by a data controller 26. The data controller 26 receives and processes commands, as well as collects and returns status to the host interface 24. The data controller 26 is also responsible for formatting the write data received from the host interface 24 and performing error correcting code ("ECC") functions for the drive 10.

Read preamplifiers of an analog preamplifier and write driver block 28 amplify the read signals from the data head 18. The amplified read signals are fed to a data channel unit 30, which supplies the data read from the tape 16 (via the block 28) to the data controller 26 and provides write data from the data controller 26 to the block 28. The servo controller 20 may be used to control the functions of the data channel unit 30, such as filter settings, type of data encoding and decoding, write current level, and amount of write precompensation.

The data channel unit 30 is a Partial-Response signaling with Maximum-Likelihood sequence detection (PRML) data channel. The PRML techniques performed by the data channel are well known in the art. They are used to maximize the likelihood that the data reconstructed by a data recovery system such as the tape drive system 10 is accurate. Thus, the data channel unit 30 uses partial-response signaling to produce signals with "controlled" intersymbol interference during a write operation and maximum-likelihood sequence to produce the most likely estimation of the recorded data during a read operation.

During a read operation, the data controller 26 performs the error correcting functions and supplies the read data as processed by the data channel unit 30 to the host interface 24. Conversely, during write operations, the data controller 26 encodes and formats write data received from the host interface 24 and supplies it to the channel unit 30. A write driver of the block 28 drives the data head structure 18, causing the write data as processed by the data channel unit 30 to be recorded on the tape 16.

The data controller 26 sends track position commands to the servo controller 20, which issues commands to a head stepper 32 for data head positioning. The head stepper 32 (which includes both stepper motor and driver functionality) operates to move the data head structure 18 laterally across the tape 16 to switch tracks. In addition to supporting track selection, the servo controller 20 is able to provide instructions to the head stepper 32 for adjusting the data head structure 18 with respect to a selected track so as to center the head over that track for optimal read performance. To that end, the servo controller 20 is configured to support a read servo process 34 that receives as an input read data signal quality values (produced by the data channel unit 30) and provides as an output to the head stepper 32 position adjustment control signals for fine-tuning the position of the data head structure relative to a selected track from which data is being read, as will be described. Thus, the servo controller 20 provides two levels of positioning, a coarse level for track switching and a finer level for maintaining track centerline.

It will be understood that the term "data" as used herein relates to user data, that is, the information provided to the system 10 via the host interface 24, as opposed to servo information (information that is produced and stored on a tape in order to provide corrective positioning information). The tape drive system 10 does not employ servo heads or servo information.

Figure 2:
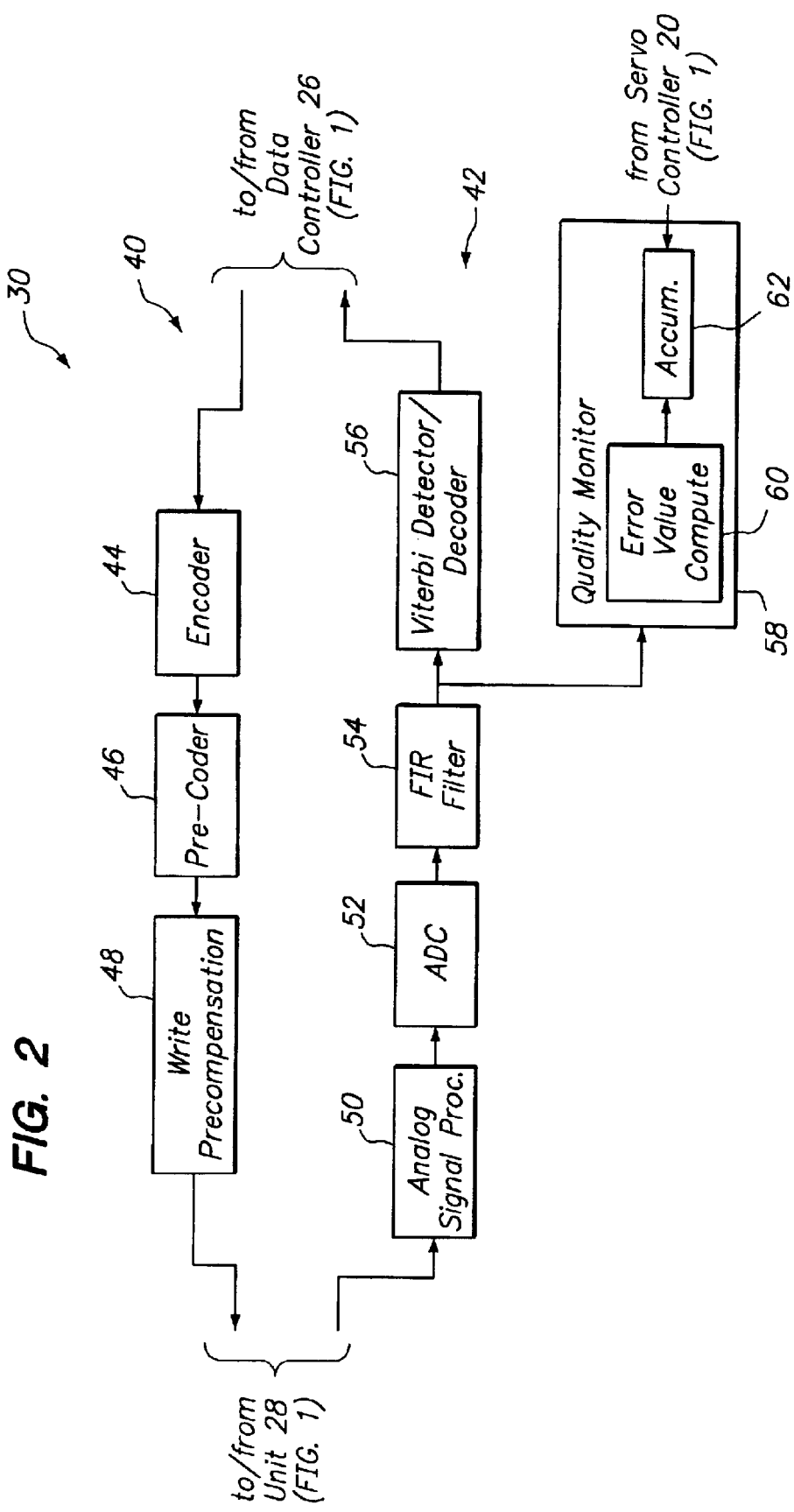
FIG. 2 is a block diagram of a PRML data channel unit that performs the read data signal quality measurements for the tape drive system of FIG. 1.

Referring to FIG. 2, the PRML data channel unit 30 includes a write path 40 and a read path 42. The write path 40, which is coupled to the data controller 26 and the preamp and write driver block 28, includes an encoder 44, a pre-coder 46 and a write precompensation circuit 48. The read path 42, also coupled to the data controller 26, the preamp and write driver block 28, as well as the servo controller 20, includes an analog signal processing block 50, an analog-to-digital converter ("ADC") 52, a finite impulse response ("FIR") filter 54, a Viterbi detector and decoder 56, and a Quality Monitor ("QM") unit 58. The QM unit 58 includes an error value computation block 60 for computing signal quality (or error) values for read data signals and an accumulator register 62 for summing the values produced by the error value computation block 60 to produce read data signal quality values. The read servo process 34 (shown in FIG. 1) samples the contents of the accumulator register, as will be described in greater detail below with reference to FIGS. 3 through 7.

The data channel unit 30 can also include other components, such as digital timing control circuits for providing timing adjustment control to the VCO, a digital gain control circuit for applying a gain control via a gain control DAC to the VGA, and a digital offset control circuit for applying a DC offset control value via an offset DAC to the offset correction amplifier.

Still referring to FIG. 2, the process of storing and retrieving data within the tape drive system 10 using the data channel unit 30 will be described. Data to be written is applied to an encoder 44 by the data controller 26 (from FIG. 1). The encoder 44 produces a modulation coded output having predefined run length constraints, such as for the minimum and maximum number of consecutive zeros and the maximum run length of zeros in the even and odd recorded sequences in the overall recorded sequence. The output of the encoder 44 is provided to the pre-coder 46, which is used to cancel the effect of the equalized data head transfer function, and thus permits the data written to encoder 44 to be the same as the data output from the decoder 56. Thus, the encoder 44 and the pre-coder 46 encode and pre-code write data into a coded data pattern having a desired partial response spectrum (e.g., PR4) suitable for writing on the tape 16 in a pattern manifesting controlled intersymbol interference. The write precompensation circuit 48 is coupled to the pre-coder 46 and provides a modulated binary pulse signal to a write driver of the block 28 (of FIG. 1).

An analog read data signal obtained at the data head is described by a transfer function. The read data signal is processed by the analog signal processing block 50. The analog signal processing block 50 typically includes a variable gain analog amplifier (VGA), a programmable analog filter/equalizer and a DC offset correction amplifier, as is known in the art. The output of the block 50 is converted to digital form by the ADC 52. Digital filter 54 receives and filters the sampled values of the ADC 52, and produces as an output equalized data samples. The output of digital filter 54 is applied to a Viterbi detector and decoder 56.

The output of the digital filter 54 is also applied to the QM unit 58. The error value computation block 60 takes as its input the equalized data samples and produces error value samples generated from the equalized data samples. The block 60 generates an error value sample by calculating the difference between an ideal (or expected) value of the data sample and the observed value of the data sample. The block 60 squares the error value samples (the squared error values also referred to as the Root Mean Squared or "RMS" error). The RMS error is a useful predictor of channel Bit Error Rate, and can be measured quickly. The greater the error values, the higher the noise levels. The block 60 provides the RMS error value sample to the accumulator register 62, which sums the squares of each error value sample. The contents of the accumulator register 62 are thus indicative of read data signal quality. The length of time that the error value samples for a read event are provided to the accumulator register is programmable. For example, it can be selected for a number of bytes. In the described embodiment, the period is defined by a window of 32 bytes.

The read servo process 34 (from FIG. 1) samples the contents of the accumulator register 62 and determines from that sampled signal quality (error) information appropriate data head position adjustments, that is, adjustments that have the effect of reducing data read signal noise levels. Consequently, the tape drive system 10 is able to track through shifts in track location, e.g., shifts caused by LTM, and stay centered on a data track.

Figure 3A:
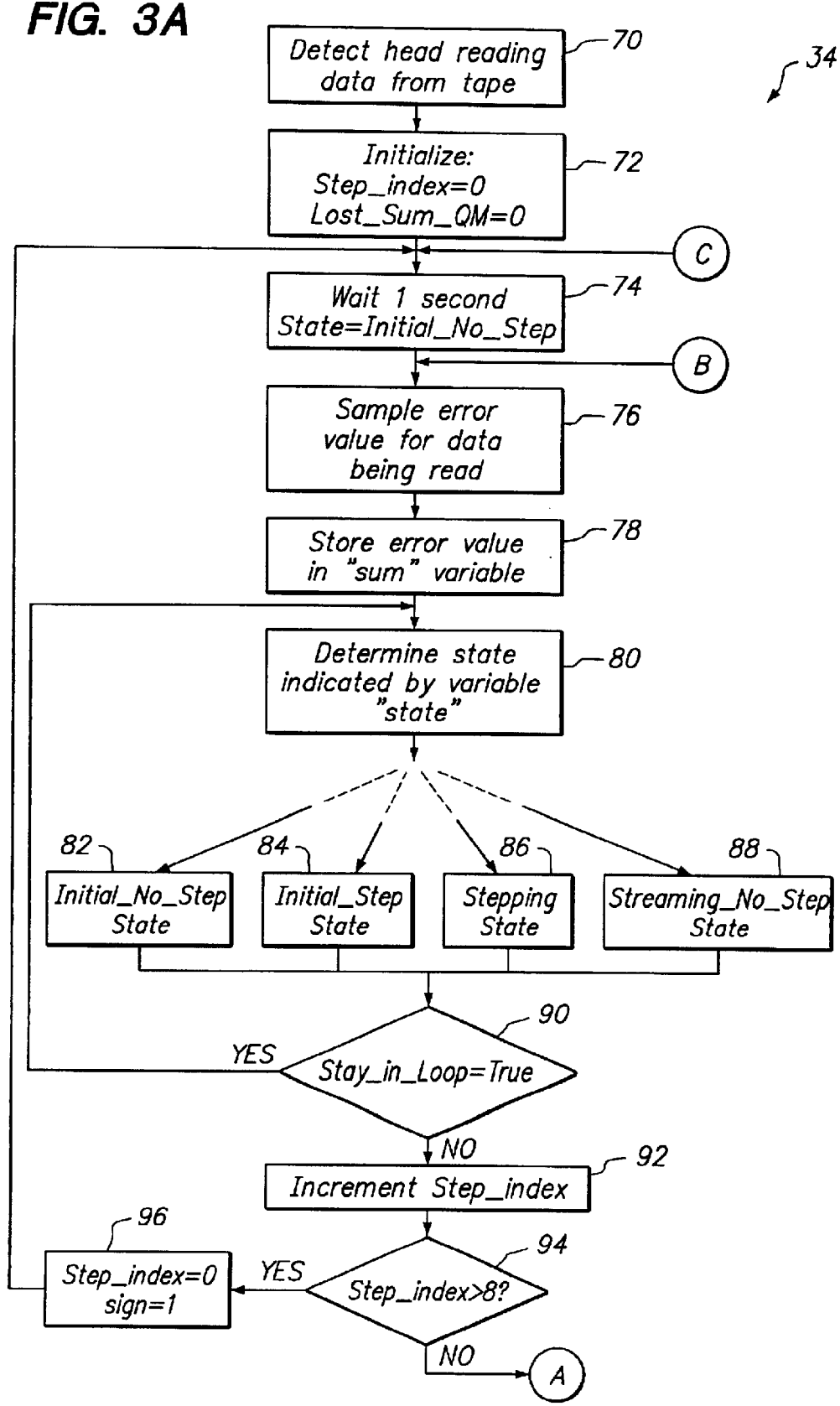
FIGS. 3A and 3B are flow diagrams of the read servo process, which includes four states: an initial/no step state; an initial step state; a stepping state and a streaming (no step) state.
Figure 3B:
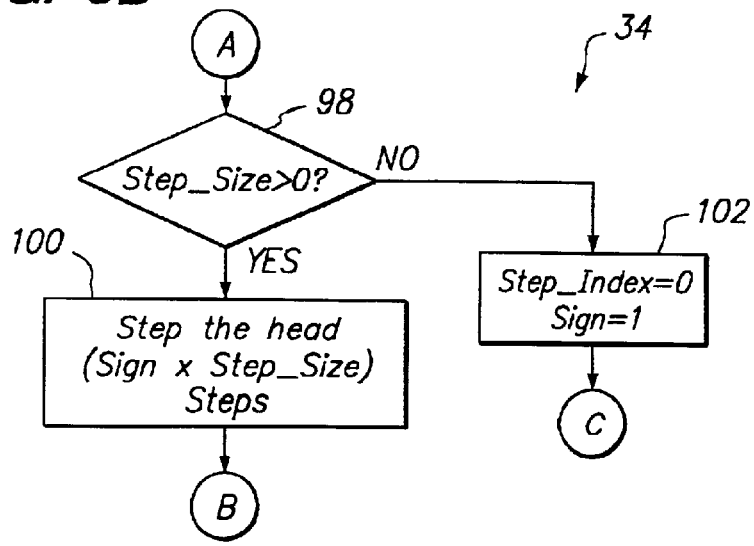

Referring to FIGS. 3A–3B, the read servo process 34 is shown in detail. Referring first to FIG. 3A, the process 34 detects that data is being read from the tape (step 70). The process 34 initializes (to zero) the variables "step_index" and "last_sum_QM" (step 72). The "step_index" stores the number of steps initiated by the process 34. The "last_sum_QM" variable maintains a previous sampled error value for comparison with a current sampled error value, as will be described. The process 34 waits a predetermined time interval and sets a variable "state" to an "initial_no_step" state (step 74). The operation associated with this state involves initialization tasks, but does not include any stepping activity. The predetermined interval is chosen to be long enough to ensure that the read servo process 34 does not interfere with any read retrial already in progress. The process 34 samples the error value (from the accumulator register 62 of FIG. 2) (step 76) and stores the error value in a variable "sum" (step 78). The variable "sum" is used to store a most recently sampled (or current) error value. The process 34 determines the value of "state" (step 80) and proceeds to the appropriate state.

More specifically, if "state" is equal to the "initial_no_step" state, the process performs the "initial_no_step" state operation (step 82). If "state" is equal to an "initial_step" state, the process 34 performs the operation corresponding to this state (step 84). If the "state" is equal to a "stepping" state, the process 34 performs the stepping state operation (step 86). If the "state" is a "streaming_no_step" state, the process 34 performs the operation for that state (step 88).

The steps (and corresponding state operations) 82, 84, 86 and 88 will be described more fully later with reference to FIGS. 4, 5, 6 and 7, respectively. Generally, that portion of the process 34 that encompasses the "initial_no_step", "initial_step" and "stepping" states may be viewed as a seek mode of operation. Between seek modes, when the process 34 is in the "streaming_no_step" state, the process 34 continues error value sampling without stepping activity, as will be described. The data head continues to read from the tape and produce error values during the read servo processing.

Still referring to FIG. 3A, since the variable "state" is equal to "initial_no_step" state, the process 34 proceeds to the "initial_no_step" state 82. Upon completion of that state's (or any other state's) operation, the process 34 determines if the value of a variable "stay_in_loop", which is set during the previous state operation, is "TRUE" (step 90). If it is, the process 34 returns to the state determination 80. If it is not, the process 34 increments by one the variable "step_index" (step 92). The process 34 determines if the value of "step index" is greater than a maximum step index threshold, in this example, a value of 8 (step 94). If the value of "step_index" is greater than 8, the process 34 resets that variable to zero and a "sign" variable equal to one (step 96), and returns to step 74.

Otherwise, and now referring to FIG. 3B, the process 34 determines if a variable "step_size" is greater than zero (step 98). The value of "step_size" corresponds to the number of steps to be performed between error value samples. A "step" unit is $\frac{1}{12}$ of a milli-inch; however, other values can be used. If the process 34 determines the value of "step_size" to be greater than zero, the process 34 instructs the head stepper to step the head a number of steps corresponding to 'sign×step_size' (step 100). The head stepper steps in an upward direction if the value of "sign" is positive or in a downward direction if the value of "sign" is negative. The process 34 then returns to step 76 (FIG. 3A). If the value of "step_size" is determined to be not greater than zero, the process 34 sets "step_index" to zero and "sign" to 1 (step 102), and returns to step 74 (FIG. 3A).

Figure 4:
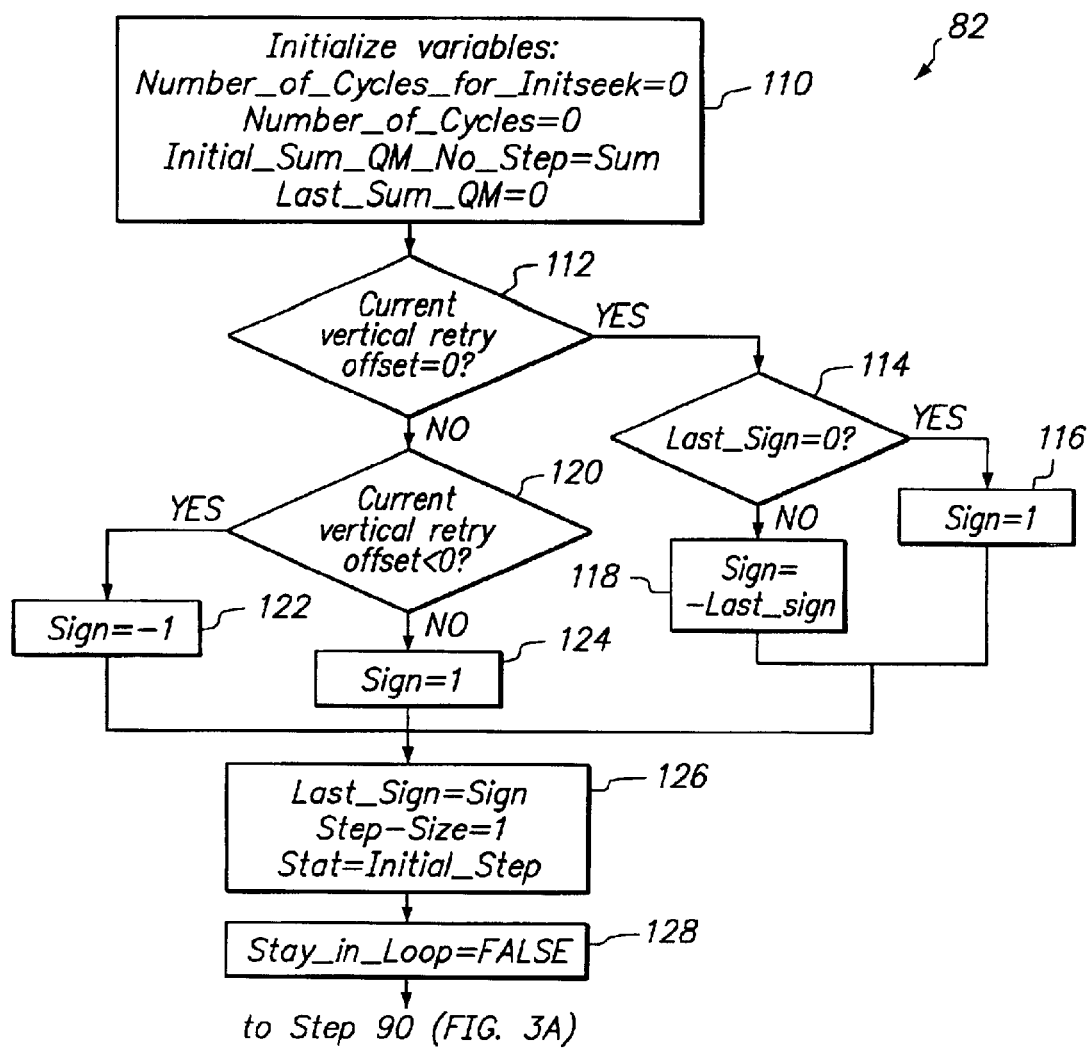
FIG. 4 is a flow diagram of the initial/no step state.

Referring to FIG. 4, the "initial_no_step" state 82 will now be described. The process 34 begins by initializing variables "number_of_cycles_for_initseek", "number_of_cycles" and "last_sum_QM" by setting these variables to a value of zero (step 110). The values of the "number_of_cycles_for_initseek" and the "number_of_cycles" variables correspond to the number of times the process 34 iteratively performs the stepping state and streaming (no step) state operations, respectively. Also, as part of step 110, the process 34 initializes a variable "initial sum_QM_no_step" to the value of the variable "sum". The process 34 determines if a current setting of a vertical retry offset parameter (used by read retrials) is equal to zero (step 112). If it is, the process 34 determines if the "last_sign" variable is equal to zero (step 114). If the value of "last_sign" equals zero, the process 34 sets "sign" equal to one (step 116). If the value of "last_sign" is not equal to zero, the process 34 sets "sign" equal to –(last_sign) (step 118). If the process 34 determines that the current vertical retry offset is not equal to zero (at step 112), the process 34 determines if the current vertical retry offset is less than zero (step 120). If so, the process 34 sets "sign" equal to '−1' (step 122). If not, the process 34 sets "sign" equal to '1' (step 124). The purpose of steps 112 through 124 is to select a direction of stepper movement that is in the same direction as that used by the retrial (as indicated by the vertical retry offset). The process 34 proceeds to set "last_sign" equal to "sign", "step_size"

equal to '1' and "state" equal to the "initial_step" state (step 126). The process also sets the value of "stay_in_loop" equal to 'FALSE' (step 130) and returns to step 90 (FIG. 3A).

Referring back to FIGS. 3A/B, if the "step_index" value is less than 8, and the step_size is greater than zero (step 98), the process 34 causes the head stepper to step the head a number of steps equal to (sign×step_size) and samples the error value for the read data signal at the current location and stores the sampled error value in the "sum" variable. The process then proceeds to the "initial_step" state.

Referring to FIG. 5, the process 34 begins the "initial step" state by setting "initial_sum_QM_step" equal to the value of "sum" (step 130). The process 34 determines if (initial_sum_QM_step-initial_sum_QM_no_step) is less than or equal to zero (step 132). That is, the process 34 determines if the amount of error value has decreased as a result of the stepping, as indicated by the sign of the difference. If so, the process 34 sets "step_size" to '1' and the variable "last_sum_QM" to the value of "sum" (step 134). Otherwise, if the change in values indicates that the noise level has increased, the process 34 changes the value of "sign" to the value of "sign" multiplied by '-1', sets "step_size" equal to '2' and set "last_sum_QM" equal to 'initial_sum_QM_no_step' (step 136). By changing the sign and changing the "step_size" value to '2', the process changes the direction of the stepping and sets up the stepper to move back one step and then over another step to see if there is improvement when moving in the opposite direction. The process 34 updates the state variable to the "stepping" state (step 138), sets the variable "stay_in_loop" equal to 'FALSE' (step 140) and returns to step 90 (FIG. 3A) to perform the processing steps of FIGS. 3A and 3B as discussed above.

Referring to FIG. 6, the process 34 begins the stepping state by determining if the most recent reduction in the error value, i.e., the absolute value of the difference between the values of "sum" and "last_sum_QM", is below a lower threshold equal to hysteresis and the value of "number_of_cycles_for_initseek" is greater than a "minseeksteps" threshold value corresponding to a threshold number of allowable steps (step 150). If yes, the process 34 sets "step_size" equal to zero and "state" equal to "streaming_no_step" (step 152). Thus, if the conditions of step 150 are both satisfied, the process terminates the seek mode, and the current position of the data head is used as a baseline for track center. If the conditions are not satisfied, the process 34 continues with the stepping activity. It increments by one the value of "number_of_cycles_for_initseek" (step 154) and determines if the value of "sum" minus the value of "last_sum_QM" is less than zero (step 156). If it is, the process 34 sets "step_size" equal to '1' (step 158). Otherwise, it sets the value of "step_size" equal to '2' and changes the value of "sign" to the value of "sign" multiplied by '-1' (step 160). After completing any one of steps 152, 158 and 160, the process 34 then updates "last_sum_QM" with the value of "sum" (step 162) and sets "stay_in_loop" to a 'FALSE' value (step 164). The process returns to step 90 (FIG. 3A).

Referring to FIG. 7, the process 34 commences the "streaming_no_step" state by incrementing the value of "number_of_cycles" (step 170). The process 34 determines if that value is now greater than or equal to a maximum parameter value "reseek_count", or if the absolute value of the difference between the values of "sum" and "last_sum_QM" is greater than hysteresis (step 172). If the process determines that either of those conditions is true, the process 34 sets the state to "initial_no_step" (step 174), sets the value of "stay_in_loop" to 'TRUE' (step 176) and returns to step 90 (FIG. 3A). That is, the process returns to the seek mode. Otherwise, the process 34 continues cycling through the streaming state until that result changes. The process 34 sets the value of "step_size" equal to zero and the value of "last_sum_QM" equal to the smaller of the "sum" and "last_sum_QM" values (step 178), sets the variable "stay_in_loop" equal to a 'FALSE' value (step 180) and returns to step 90 (FIG. 3A).

Thus, in seek mode, the process 34 samples a baseline signal quality level at a current tracking position (by reading an initial error value from the accumulator register) and begins an iterative process of stepping the data head in small amounts, sampling the register and determining from the sampling a change in error value in order to guide the stepping activity towards error value reduction. Once a satisfactory degree of signal quality improvement is achieved, for example, and as described above, the change in error value and the number of steps reach predefined thresholds (and therefore little improvement is to be gained by further stepping activity), the process 34 stops stepping and uses the new error value as a new baseline signal quality level. During the streaming state, the error value is again sampled and, if the error value has changed significantly, the process 34 returns to the initial state ("initial_no_step") of the seek mode and starts stepping the data head to search for a new baseline level. As described above, the streaming state also allows for a return to the seek mode operation if the amount of time that has expired since the last seek mode operation ended is greater than some larger interval (e.g., 30 seconds). The process 34 is able to start seeking at the initial state, searching for the new track center on the current section of tape that may provide a more optimal baseline.

Other embodiments are within the scope of the following claims.

What is claimed is:

1. A method of controlling a data head for reading data from a data track on a magnetic tape in a magnetic tape drive, comprising:

determining signal quality for read data signals produced by a data head reading user data from a data track;

adjusting the position of the data head relative to the data track;

again determining signal quality for read data signals produced by the data head reading user data;

determining a change in the signal quality corresponding to the adjustment in data head position; and continuing to adjust the position of the data head relative to the data track until a predetermined level of improvement in the signal quality is achieved.

2. The method of claim 1 wherein adjusting the position of the data head comprises:

stepping of the data head laterally across the data track.

3. The method of claim 2, wherein adjusting the position of the data head further comprises:

using the determined change in signal quality to determine direction and size of a step of the stepping.

4. The method of claim 3, wherein continuing to adjust the data head position comprises:

comparing each determined change in signal quality to a lower threshold.

5. The method of claim 4, wherein continuing to adjust the data head position comprises:

maintaining the data head at a current position in response to a result of the comparison indicating that the determined change is below the lower threshold.

6. The method of claim 5, wherein the lower threshold comprises a hysteresis value.

7. The method of claim 5, wherein continuing to adjust the data head position comprises:

monitoring the signal quality while maintaining the data head at the current position to detect any changes in the signal quality greater than the lower threshold; and if any changes greater than the lower threshold are detected, again adjusting the data head position and determining the signal quality.

8. The method of claim 5, wherein continuing to adjust the data head position comprises:

determining that the data head has been maintained at the current position without stepping for a period of time in excess of a predetermined maximum time threshold; and again adjusting the data head position and determining the signal quality.

9. The method of claim 3, wherein continuing to adjust the position of the data head further comprises:

comparing each of the determined changes to a lower threshold; and comparing a current number of steps to a maximum number of steps.

10. The method of claim 9, wherein continuing to adjust further comprises:

maintaining the data head at a current position in response to a result of the comparison indicating that the determined change is below the lower threshold and the current number of steps taken exceeds the maximum number of steps.

11. The method of claim 1, wherein determining signal quality comprises: obtaining the signal quality from a read channel device.

12. The method of claim 1, wherein the signal quality comprises error values.

13. The method of claim 12, wherein the error values are indicative of errors between observed values and ideal values for the read data.

14. The method of claim 1, wherein the signal quality relates to noise in the read data signals.

15. The method of claim 1, wherein the read data signals do not include servo information.

16. The method of claim 1, wherein adjusting comprises aligning the data head with the data track.

17. An apparatus for controlling a data head to read data from a data track on a magnetic tape in a magnetic tape drive, comprising:

a computer program in memory for:

determining signal quality for read data signals produced by a data head reading user data from a data track;

adjusting the position of the data head relative to the data track;

again determining signal quality for read data signals produced by the data head reading user data;

determining a change in the signal quality corresponding to the adjustment in data head position; and continuing to adjust the position of the data head relative to the data track until a predetermined level of improvement in the signal quality is achieved.

18. The apparatus of claim 17, wherein adjusting the position of the data head comprises:

stepping of the data head laterally across the data track.

19. The apparatus of claim 18, wherein adjusting the position of the data head further comprises:

using the determined changes to determine direction and size of steps of the stepping.

20. The apparatus of claim 19, wherein performing the seek operation further comprises:

comparing each of the determined changes to a lower threshold.

21. The apparatus of claim 20, wherein continuing to adjust the position of the data head further comprises:

maintaining the data head at a current position in response to a result of the comparison indicating that the determined change is below the lower threshold.

22. The apparatus of claim 21, wherein the lower threshold comprises a hysteresis value.

23. The apparatus of claim 21, wherein continuing to adjust the position of the data head further comprises:

monitoring the signal quality while maintaining the data head at the current position to detect any changes in the signal quality greater than the lower threshold; and if any changes greater than the lower threshold are detected, again adjusting the data head position and determining the signal quality.

24. The apparatus of claim 21, wherein continuing to adjust the position of the data head further comprises:

determining that the data head has been maintained at the current position without stepping for a period of time in excess of a predetermined maximum time threshold; and again adjusting the data head position and determining the signal quality.

25. The apparatus of claim 19, wherein continuing to adjust the position of the data head further comprises:

comparing each of the determined changes to a lower threshold; and comparing a current number of steps taken by the seek operation to a maximum number of steps.

26. The apparatus of claim 25, wherein adjusting further comprises:

maintaining the data head at a current position in response to a result of the comparison indicating that the determined change is below the lower threshold and the current number of steps taken exceeds the maximum number of steps.

27. The apparatus of claim 17, wherein determining signal quality comprises:

obtaining the signal quality from a read channel device.

28. The apparatus of claim 17, wherein the signal quality comprises error values.

29. The apparatus of claim 28, wherein the error values are indicative of errors between observed values and ideal values for the read data.

30. The apparatus of claim 17, wherein the signal quality relates to noise in the read data signals.

31. The apparatus of claim 17, wherein the read data signals do not include servo information.

32. The apparatus of claim 17, wherein adjusting comprises aligning the data head with the data track.

33. A tape drive system comprising:

a data head structure to produce read data signals from user data recorded on a data track of a tape;

a head stepper coupled to the data head structure;

a data channel unit to produce read data signal quality values from the read data signals; and a servo controller coupled to the head stepper and the data channel unit, the servo controller being configured to use the signal quality values to control adjustment of the position of the data head structure relative to the data track by the head stepper, wherein the controller adjusts the position of the data head structure relative to the data track until a predetermined level of improvement in the signal quality values is achieved.

34. The system of claim 33, wherein the signal quality values relate to noise in the read data signals.

35. The system of claim 33, wherein the read data signals do not include servo information.

36. The system of claim 33, wherein adjusting comprises aligning the data head structure with the data track.

* * * * *